(12) United States Patent
Wada et al.

(10) Patent No.: US 7,548,273 B2
(45) Date of Patent: Jun. 16, 2009

(54) IMAGE PROCESSING METHOD AND DEVICE USING PHOTO ASSISTANT TOOL INCLUDING ROTATOR

(75) Inventors: Shinya Wada, Kawasaki (JP); Akira Suzuki, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 749 days.

(21) Appl. No.: 10/943,505

(22) Filed: Sep. 17, 2004

(65) Prior Publication Data
US 2005/0104999 A1 May 19, 2005

(30) Foreign Application Priority Data
Sep. 19, 2003 (JP) ............................. 2003-328806

(51) Int. Cl.
H04N 5/225 (2006.01)
H04N 13/02 (2006.01)
H04N 15/00 (2006.01)

(52) U.S. Cl. ........................................ 348/373; 348/47
(58) Field of Classification Search .................. 348/42, 348/46, 47, 373, 50, 218.1, 39; 396/324, 396/325, 329
See application file for complete search history.

(56) References Cited
U.S. PATENT DOCUMENTS

| 4,613,898 | A * | 9/1986 | Bagnall-Wild et al. | 348/39 |
| 6,215,461 | B1 * | 4/2001 | Ishibashi et al. | 348/39 |
| 6,301,447 | B1 * | 10/2001 | Jackson et al. | 348/50 |
| 6,644,816 | B1 * | 11/2003 | Perra et al. | 348/36 |
| 7,012,637 | B1 * | 3/2006 | Blume et al. | 348/218.1 |
| 2004/0141089 | A1 * | 7/2004 | Wada | 348/375 |
| 2004/0183941 | A1 * | 9/2004 | McCutchen | 348/373 |

FOREIGN PATENT DOCUMENTS

| JP | 29-14154 | 10/1954 |
| JP | 8-152693 | 6/1996 |
| JP | 11-164326 | 6/1999 |
| JP | 11-341328 | 12/1999 |
| JP | 2001-320736 | 11/2001 |
| JP | 2003-131329 | 5/2003 |

OTHER PUBLICATIONS

Notification of Reason(s) for Refusal dated Sep. 12, 2006.

* cited by examiner

*Primary Examiner*—Lin Ye
*Assistant Examiner*—Jason Whipkey
(74) *Attorney, Agent, or Firm*—Katten Muchin Rosenman LLP (57) ABSTRACT

A photographic method of a stereoscopic image or an omnidirectional image has hidden potential of creating innovative video systems and video services that have never existed before. A photo assistant tool includes: a rotator formed by a ring-shaped circular member; a first imaging section and a second imaging section provided on an upper face of the rotator; and a support base. The first imaging section and the second imaging section take a pair of parallax images. At the same time, by continuous shots taken by the first imaging section and the second imaging section while the rotator is being rotated about a center as a center of rotation, omnidirectional parallax images are obtained. Furthermore, by continuous shots taken by the first imaging section and the second imaging section while the rotator is being continuously rotated, a motion picture made up of omnidirectional parallax images as frames is taken.

8 Claims, 10 Drawing Sheets

IMAGE PROCESSING METHOD AND DEVICE USING PHOTO ASSISTANT TOOL INCLUDING ROTATOR

BACKGROUND OF THE INVENTION

1. Field of the Invention

The present invention relates to a photo assistant tool and an image processing device. The present invention relates, in particular, to a technique for realizing stereoscopic photography and omnidirectional image photography.

2. Description of the Related Art

A stereoscopic image is obtained by stereoscopic photography for photographing the same subject from different points of view. Owing to a parallax generated in the stereoscopic image, a depth can be represented to realize a binocular stereoscopic vision. The binocular stereoscopic vision can be achieved by a method of using a dedicated apparatus such as liquid crystal shutter glasses, by stereoscopic viewing with naked eyes by a cross-eyed method or a parallel-viewing method without using any special apparatuses, or the like. Moreover, a 360-degree image, that is, an omnidirectional image can be obtained by capturing an image with a so-called omnidirectional camera. If a strain contained in the omnidirectional image is removed by image processing, the omnidirectional image can be transformed into a panoramic image.

Since it is conventionally necessary to use a special camera that is specialized for each type of photography, such as a stereoscopic camera or an omnidirectional camera, so as to obtain a stereoscopic image or an omnidirectional image, the above-described photographic technique can not always be used for a general purpose. Therefore, a method of using such a photographic technique is limitative. However, such a special camera or a photographic technique has hidden potential of creating innovative video systems and video services that have never existed before. The inventor of the present invention has successfully developed such an unknown system.

SUMMARY OF THE INVENTION

The inventor of the present invention has devised the present invention based on the above-described knowledge, and has an object of realizing an innovative photographic technique using stereoscopic photography or omnidirectional image photography.

One aspect of the present invention is a photo assistant tool. The photo assistant tool includes: a rotator formed by a member having a rotating face which is supported so as to be approximately horizontal; and an imaging section provided on the rotating face so as to be distant from a center of rotation of the rotator, the imaging section being for imaging a subject from the provided position. The imaging section keeps a photographic direction to be approximately parallel to the rotating face. However, the rotator may be supported to have a certain tilt with respect to the horizontal or may exceed the horizontal range so as to be supported in an approximately vertical direction as long as it is rotatably supported. The imaging section may exceed the approximately parallel range so as to have a tilt with respect to the rotator as long as its photographic direction can be kept at an angle that allows the almost entire surroundings to be photographed in accordance with the rotation of the rotator.

The rotator may be formed in a ring shape, a disc shape, or a dish shape or may be formed by an elongated or bar-like member having its center as a center of rotation. Any shape can be used as long as the rotator is rotatable without any problems. A support base such as a tripod may be attached to the center of the bottom face of the rotator. The imaging section has a photographic function of a digital image or a photographic function on a film. The imaging section may be separatable as an individual camera.

The imaging section may be a camera incorporated into or built in the rotator. The imaging section may be a digital camera or a film camera. A camera may be attached to the rotator as the imaging section and the camera may be set to perform continuous shooting and a timer is set as needed. At this time, the rotator may be manually rotated or automatically rotated by using a motor and the like. If continuous shooting is executed twice or more while the rotator is rotating, a plurality of images taken from different points of view can be obtained. It is preferred that the continuous shooting be executed about twice or more while the rotator is rotating at 360 degrees. However, depending on the intervals of continuous shots a distance between points of view, that is, a distance between photographic points may become small. As a result, a parallax may be reduced. Therefore, the number of continuous shots may be increased to expand the scope of image selection that follows. Even if it is not continuous shooting, a picture may be taken each time the angle of rotation is changed to stop the movement of the rotator. The rotator may be rotated at a high speed to perform high-speed continuous shooting so as to take a plurality of images in respective different directions. Since a radius of the rotator, that is, a radius of gyration of the imaging section is already known, a distance between a plurality of points of view can be calculated from the angle of rotation and the radius of gyration. Therefore, it is possible to calculate a distance to a subject or to generate an interpolated image or a three-dimensional model by image interpolation.

According to this aspect, parallax images or an omnidirectional image can be obtained by the rotation of the rotator. Alternatively, an omnidirectional image can also be obtained by the rotation of the imaging section itself. As a result, an omnidirectional image which can be binocularly stereoscopically viewed can be obtained. Therefore, various types of photography for special effects that have never existed before can be realized by a single piece of equipment.

Another aspect of the present invention is an image processing method. The method includes: performing continuous shooting in a photographic direction approximately parallel to a rotating face of a predetermined rotatable member by an imaging section provided for the number having the rotating face in an approximately horizontal direction while the predetermined member is rotating; and reading continuously shot images taken during the rotation of the member.

The "predetermined member" may be an approximately ring-shaped, approximately disc-shaped or approximately dish-shaped rotator. The image processing method may be realized by the combination of the above-described photo assistant tool and an image processing device described below or may be realized by the use of the photo assistant tool also having an image processing function. In this manner, a structure which realizes the image processing method is not limited.

According to this aspect, not only parallax images and an omnidirectional image but also an innovative image that has never existed before such as an omnidirectional image that can be binocularly stereoscopically viewed can be obtained.

A further aspect of the present invention is an image processing device. The image processing device includes: an image input section which leads a plurality of images continuously shot in a photographic direction approximately parallel to a rotating face of a predetermined rotatable member by an imaging section provided for the predetermined member having the rotating face in an approximately horizontal direction while the predetermined member is rotating; an image retaining section which stores the plurality of images in correlation with their photographic timing; and an output processing section which outputs the plurality of stored images.

According to this aspect, parallax images or an omnidirectional image are generated from the image obtained by photography using special equipment so as to be output to a screen of a projector, a monitor or the like. As a result, an innovative image that has never existed before such as an omnidirectional image that can be binocularly stereoscopically viewed can be obtained.

A further aspect of the present invention is an image processing method. The method includes: reading a plurality of images continuously shot in a photographic direction approximately parallel to a rotating face of a rotatably supported predetermined member by an imaging section provided for the predetermined member while the predetermined member is rotating; storing the plurality of images in correlation with their photographic timing; and outputting the plurality of stored images.

According to this aspect, not only parallax images or an omnidirectional image but also an innovative image that has never existed before such as an omnidirectional image that can be binocularly stereoscopically viewed can be obtained from the images obtained by photography using special equipment.

An arbitrary combination of the components described above, the component or the representation of the present invention which is mutually replaced with a method, a device, a system, a computer program, a recording medium storing a computer program, a data structure or the like are also effective as embodiments of the present invention.

DETAILED DESCRIPTION OF THE INVENTION

Embodiment 1

A photographic system according to Embodiment 1 of the present invention uses a photo assistant tool including a plurality of imaging sections for parallax image photography. Stereoscopic photography is carried out while a rotator provided with the plurality of imaging sections is being rotated, thereby realizing the photography of omnidirectional parallax images and providing a binocular stereoscopic vision of such images.

Figure 1:
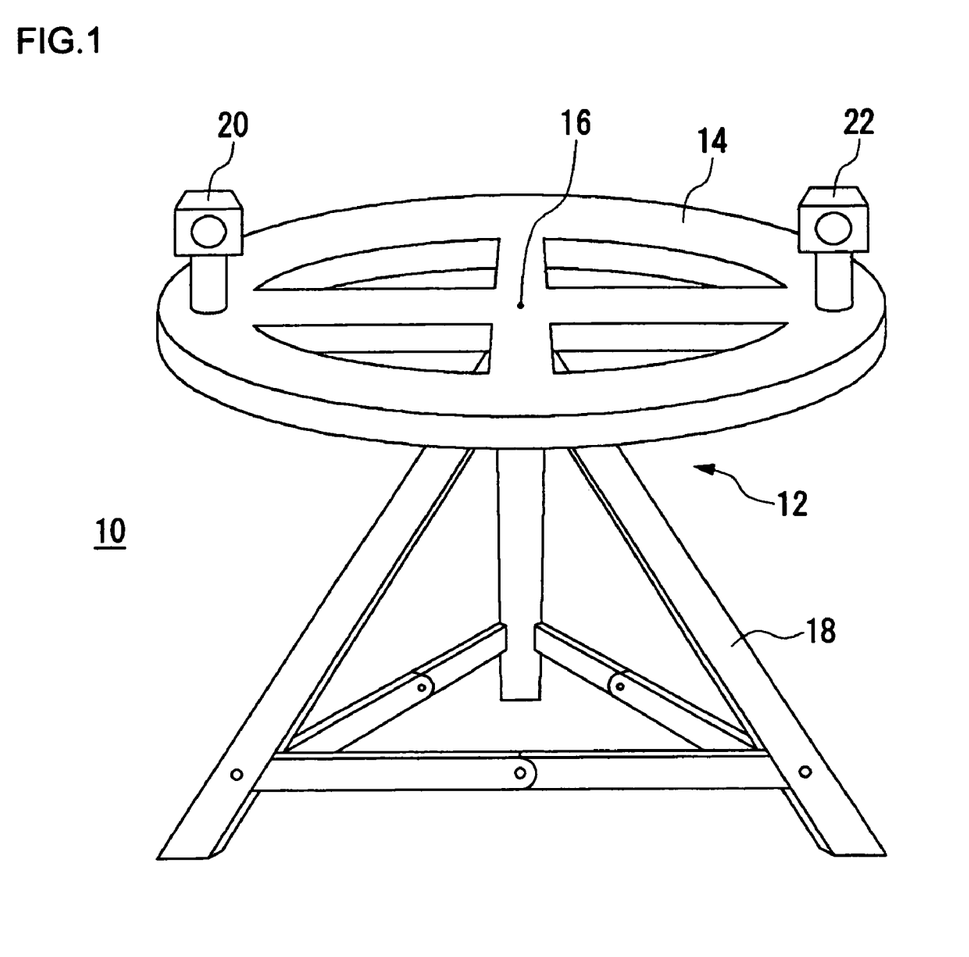
FIG. 1 is a view showing the outer appearance of a photo assistant tool in a photographic system.

FIG. 1 shows the outer appearance of a photo assistant tool in a photographic system. A photo assistant tool 12 constituting a photographic system 10 mainly includes: a rotator 14; a plurality of imaging sections 20 and 22; and a support base 18. The rotator 14 is formed by a ring-shaped member and is rotatably supported from its bottom face side with a center 16 of the ring as a center of rotation. The rotator 14 is supported by the support base 18. At the same time, the rotation of the rotator 14 is controlled by a control section not shown. A rotating face of the rotator 14 is approximately horizontal. The rotator 14 and the support base 18 have deadweights that are required to smoothen the rotational movement of the rotator 14. At positions in the vicinity of the outer circumference on an upper surface of the rotator 14, that is, at a plurality of positions, each being a predetermined distance away from the center 16, on the rotating face of the rotator 14, the first imaging section 20 and the second imaging section 22 are provided. The first imaging section 20 and the second imaging section 22 photograph a subject from the respective positions where they are provided. At the same time, the photographic directions of the first imaging section 20 and the second imaging section 22 are kept approximately horizontal and in the same orientations that is, kept so as to be approximately parallel to each other.

With the rotation or the rotator 14, the first imaging section 20 and the second imaging section 22 circularly moves with a distance from the center 16 of the rotator 14 to the first imaging section 20 or the second imaging section 22 as a radius of gyration. During the circular movement, the first imaging section 20 and the second imaging section 22, which are present on an orbit of the circular movement, are made to take continuous shots. As a result, parallax images are obtained by capturing the subject from a plurality of points of views, while the parallax images are obtained for each direction of the surroundings. Therefore, parallax images can be taken as an omnidirectional image. In particular, by taking high-speed continuous shots while continuously rotating the rotator 14 at a high speed, a fine omnidirectional motion picture can be obtained.

Figure 2:
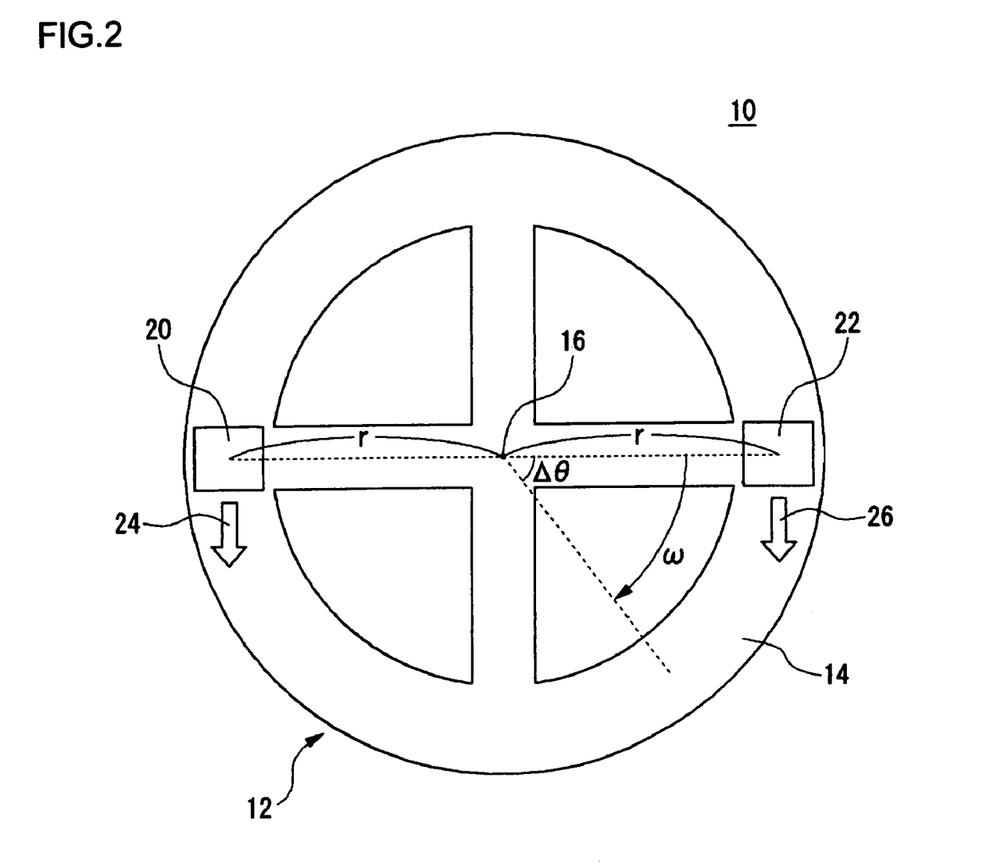
FIG. 2 is a view showing the outer appearance of a rotator when viewed from above.

FIG. 2 shows the outer appearance of the rotator 14 when viewed from above. The rotator 14 is formed by a ring-shaped circular member. Inside the ring, a spoke extending from the center 16 in a cross shape is provided. The center 16 corresponding to the intersection of the spoke is the center of rotation of the rotator 14. The rotator 14 is connected to the support base 18 on the bottom face side of the center 16. At the approximate center positions of the rotator 14 on the right and left sides in FIG. 2, the first imaging section 20 and the second imaging section 22 are provided. The photographic directions of the first imaging section 20 and the second imaging section 22 are downward in FIG. 2 and are kept approximately parallel to each other. In a modified example, however, the photographic directions of the first imaging section 20 and the second imaging section 22 may be adjusted to cross each other at a distant position depending on a distance to the subject.

Assuming that the distance from the center 16 of the rotator 14 to the first imaging section 20 or the second imaging section 22, that is, the radius of gyration of the circular movement of the first imaging section 20 and the second imaging section 22 is r, a distance between the first imaging section 20 and the second imaging section 22 is 2r. Assuming that a rotation cycle of the rotator 14 is $T_0$ (sec), an angular rate ω of the rotation is $2\pi/T_0$ (rad/sec). Assuming that a photographic frame rate of the first imaging section 20 and the second imaging section 22 is σ (frame/sec), an angle of rotation Δθ between frames is ω/σ (rad). Therefore, one image is taken for each of the right and left sides at each angle of rotation Δθ. Therefore, the number of images taken while the rotator 14 rotates at 360 degrees is $2\pi/\Delta\theta = \sigma T_0$ (images).

Figure 3:
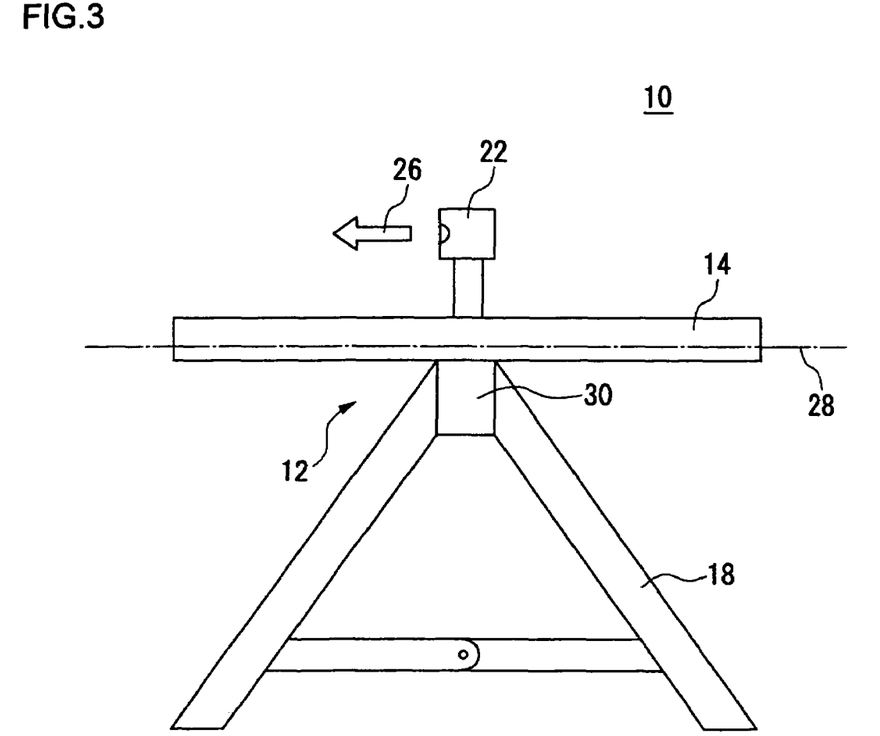
FIG. 3 is a view showing the outer appearance of the photo assistant tool when viewed from its lateral side.

FIG. 3 shows the outer appearance of the photo assistant tool 12 when viewed from its lateral side. The second imaging section 22 is provided so as to be placed on the upper surface of the rotator 14. Although the first imaging section 20 is not shown in FIG. 3, the first imaging section 20 is the same as the second imaging section 22 as described below. A second photographic direction 26 of the second imaging section 22 is kept approximately parallel to the rotating face 28 of the rotator 14 and approximately horizontal. The support base 18 includes a foldable tripod. For example, a general-propose camera tripod may be used as the tripod. As a modified example, the rotator 14 and the support base 18 may be integrally formed.

The rotator 14 is connected to the support base 18 through a control section 30. The control section 30 includes: a power generator mechanism such as a motor; and an electronic structure responsible for control of the power generator mechanism and control of photography. More specifically, the control section 30 controls the rotation of the rotator 14 and is electronically connected to the first imaging section 20 and the second imaging section 22 so as to control the shooting of the imaging sections. The control section 30 is provided with a terminal not shown so as to externally output images taken by the first imaging section 20 and the second imaging section 22.

Figure 4:
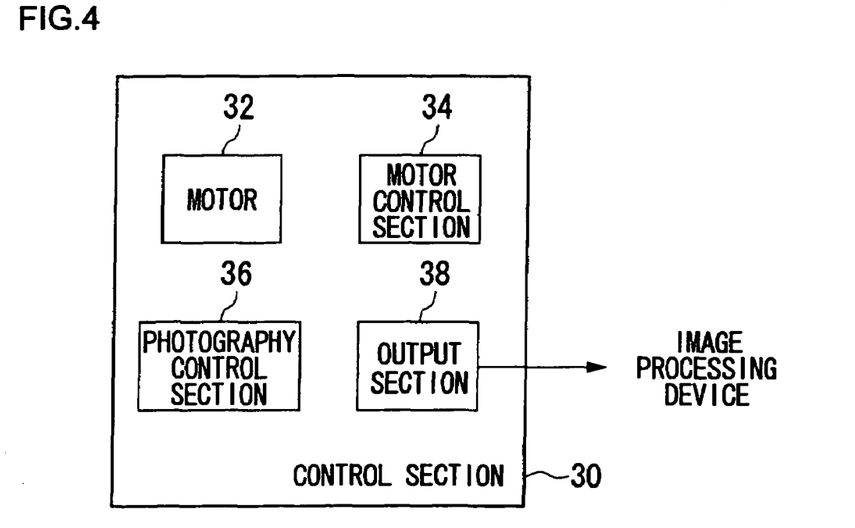
FIG. 4 is a functional block view showing the internal structure of a control section in a support base.

FIG. 4 is a functional block diagram showing an internal structure of the control section 30 in the support base 18. The control section 30 includes: a motor 32; a motor control section 34; a photography control section 36; and an output section 38. The motor 32 generates power under control of the motor control section 34 so as to rotate the rotator 14. As the motor 32, for example, a stepping motor that can finely control the angle of rotation or a motor having a larger torque such as a DC motor may be used. The motor control section 34 controls the motor 32 to keep the rotational speed of the rotator 14 constant. The rotational speed, the rotation timing, and the number of revolutions of the rotator 14 can be externally set as photographing conditions. The photography control section 36 controls the first imaging section 20, and the second imaging section 22 to perform continuous shooting while the rotator 14 is being rotated by the motor 32. The photographing intervals are kept constant. The photographing intervals, the photographing timing, and the number of shots can also be externally set as photographing conditions. The output section 38 receives images taken by the first imaging section 20 and the second imaging section 22 from the first imaging section 20 and the second imaging section 22 so as to output the received images to an external image processing device. The output section 38 may externally output photographed images each time the images are taken by the first imaging section 20 and the second imaging section 22, or may temporarily store photographed images therein to then externally output a plurality of stored photographed images at appropriate timing at a time.

Figure 5:
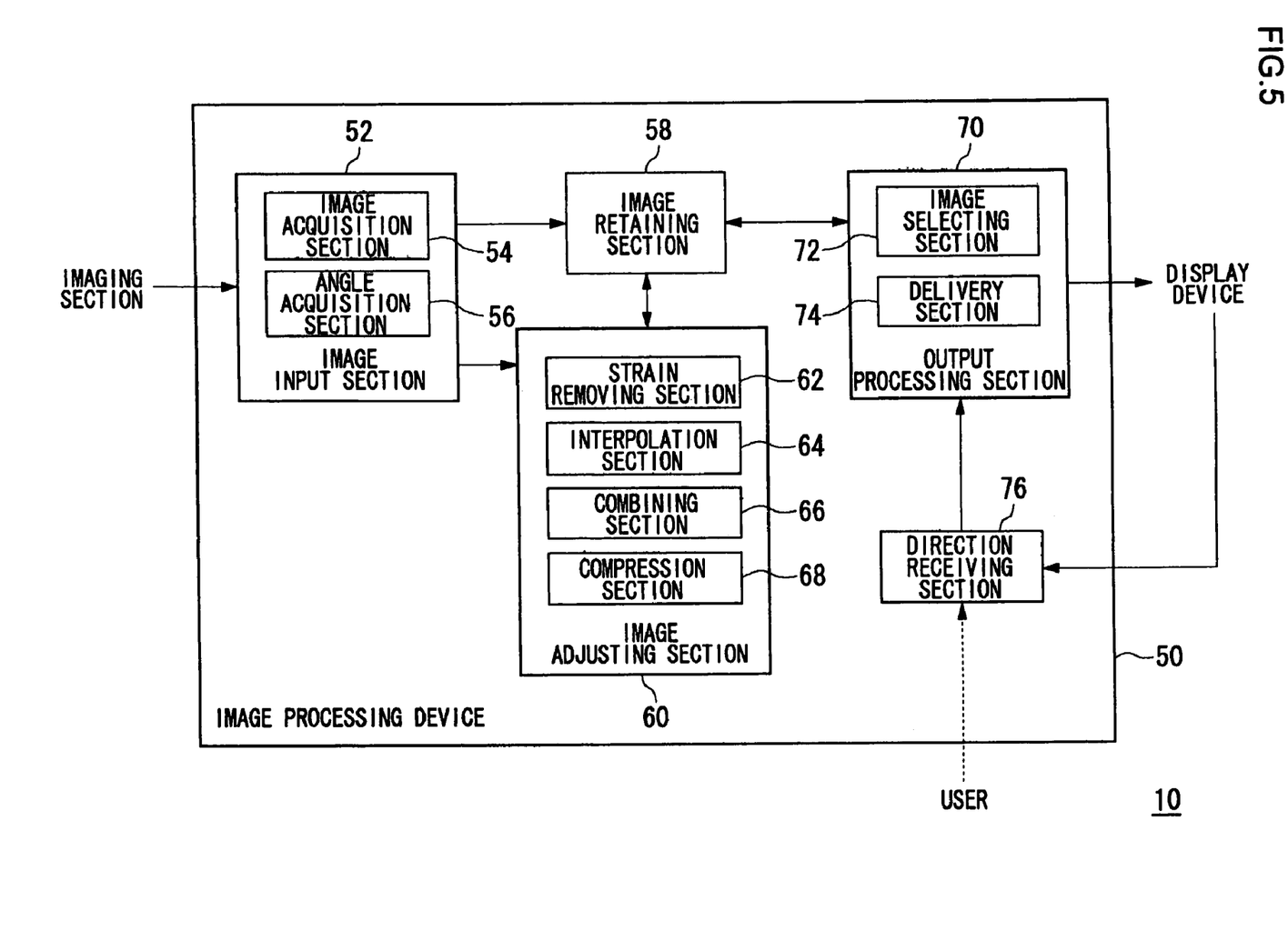
FIG. 5 is a functional block view of an image processing device.

FIG. 5 is a functional block diagram of an image processing device. An image processing device 50 mainly includes: an image input section 52; an image retaining section 58; an image adjusting section 60; an output processing section 70; and a direction receiving section 76. The image processing device 50 can be realized by an element including a CPU of a computer in terms of hardware and can be realized by a program having an image processing function or the like in terms of software. FIG. 5 described below illustrates functional blocks realized by the cooperation between them. Therefore, these functional blocks can be realized in various forms by the combination of a hardware and a software.

The image input section 52 includes: an image acquisition section 54 which reads a plurality of images taken by the first imaging section 20 and the second imaging section 22 at timing at different angles of rotation; and an angle acquisition section 56 which acquires the angle of rotation of the rotator 14 at the respective photographing timing of the plurality of images. For example, the angle acquisition section 56 may detect the angle of rotation upon photographing based on the photographing timing obtained from the photography control section 36 of the control section 30 and the angle of rotation obtained from the motor control section 34. Alternatively, for example, assuming that an angular rate of the rotation of the rotator 14 is constant and the photographing intervals are constant, the angle of rotation on photographing may be calculated based on the number of taken images beginning with the first image.

The image acquisition section 54 stores the plurality of images read from the first imaging section 20 and the second imaging section 22 in the image retaining section 58. At this step, a pair of images taken by the first imaging section 20 and the second imaging section 22 at a time form parallax images. More specifically, after the image taken by the first imaging section 20 is determined as an image for the right eye whereas the image taken by the second imaging section 22 is determined as an image for the left eye, these images are stored in the image retaining section 58 as parallax images. The storage processing is repeated each time images are read. At the same time, continuously shot images corresponding to a full circle of the rotator 14 are positioned as an omnidirectional image formed by a group of frames. While the rotator 14 is further being rotated for a plurality of full circles, a set of omnidirectional parallax images is repeatedly stored as a frame group for each revolution. As a result, a motion picture made up of omnidirectional parallax images can be obtained. As described above, a plurality of images are stored in the image retaining section 58 in correlation with them photographing timing.

The image retaining section 58 retains the plurality of images read out from the photo assistant tool 12 by the image input section 52 at least until the output processing section 70 directs the image retaining section 58 to output them. The image retaining section 58 may be, for example, a buffer memory suitable for temporary storage, or may be a magnetic recording medium such as a hard disk or an optical recording medium such as a DVD, which is suitable for long-term storage, or their drives. The image adjusting section 60 performs adjustment processing in accordance with the needs on the images stored from the image acquisition section 54 to the image retaining section 58. The image adjusting section 60 includes: a strain removing section 62; an interpolation section 64; a combining section 66; and a compression section 68.

The strain removing section 62 removes, for example, a strain generated in an image, or "offset" or a "blur" of an image generated along with high-speed rotation of the rotator 14. The interpolation section 64 generates an intermediate frame between frames by interpolation or extrapolation. As a result, the number of obtained frames can be larger than the number of shots. The combining section 66 combines a plurality of images to obtain a single image. For example, the combining section 66 combines a plurality of omnidirectionally taken images so as to partially overlap them to generate a single panoramic image. Moreover, after generating a single panoramic image, the combining section 66 may extract an image corresponding to an arbitrary angle of view. For example, after generating a 360-degree panoramic image corresponding to one full circle from six images for one revolution, 36 images whose angle of view is each shifted by 10 degrees may be extracted. In this case, an image to be displayed can be selected by specifying an angle of view in units of 10 degrees. The compression section 68 compresses the plurality of images stored in the image retaining section 58 in a predetermined format such as a JPEG format or an MPEG format.

The output processing section 70 outputs the images stored in the image retailing section 58 to an external display device based on a direction of a user or a direction from the external display device, which is received through the direction receiving section 76. The output processing section 70 outputs either one of or both of the omnidirectional image and the parallax images in accordance with display performance of the external display device connected thereto. The output processing section 70 includes: an image selecting section 72 which selects an image to be output; and a delivery section 74 which externally delivers the selected image. The external display device may be a display device including an omnidirectional screen having a curved form such as a cylindrical inner face or a liquid crystal projector which projects an image on such an omnidirectional screen. In this case, the display device inputs a direction of delivery of the omnidirectional image to the direction receiving section 76. The delivery section 74 delivers the omnidirectional image for the right eye and the omnidirectional image for the left eye while alternately switching them at a high speed. A viewer at the position of the central axis of a cylinder puts on glasses with liquid crystal shutters. The liquid crystal shutters repeat openings and closing the right and left shutters in synchronization with the switching between the right-eye image and the left-eye image by the delivery section 74. As a result, the parallax images can be binocularly stereoscopically viewed over all the directions. As a modified example, the display device may project an image on an omnidirectional spherical display.

As another example, the display device may be a head mounted display (hereinafter, referred to simply as an "HMD") mounted on a head of a viewer of an image. In this case, a direction sensor included in the HMD detects a direction in which the face of a viewer is currently oriented. Then, the direction sensor transmits the detected direction to the direction receiving section 76 as information regarding a direction directed by the viewer of an image. The direction receiving section 76 directs the image selecting section 72 which image of which direction is to be transmitted based on the acquired information regarding a direction. The direction sensor of the HMD may detect an absolute direction or may detect an angle of rotation as a relative direction based on a predetermined direction as a reference. In the case where the direction sensor of the HMD detects the absolute direction while the angle acquisition section 56 of the image processing device 50 detects the absolute direction for each photographed image so that the image is stored in the image retaining section 58 in correlation with the absolute direction, for example, a three-dimensional image of a specific building at a distance can be photographed by the photo assistant tool 12 so as to be displayed in precise correlation with an actual direction in which a viewer is oriented in the HMD. As a modified example, the direction receiving section 76 may feed back to the imaging section such as the first imaging section 20 or the second imaging section 22, which image of which direction is to be taken based on the acquired information regarding a direction. In this case, the first imaging section 20 and the second imaging station 22 control the photographic direction based on the feedback information indicating which image of which direction is to be taken. As a result, only an image of a direction in which a viewer of the image is oriented can be taken so as to be displayed by the HMD.

The display device may be a general monitor such as a liquid crystal display as another example. The image processing device 50 may be connected to the photo assistant tool 12 through a network such as the Internet and a video image distribution device so as to remotely request the distribution of video images by the video image distribution device.

Figure 6:
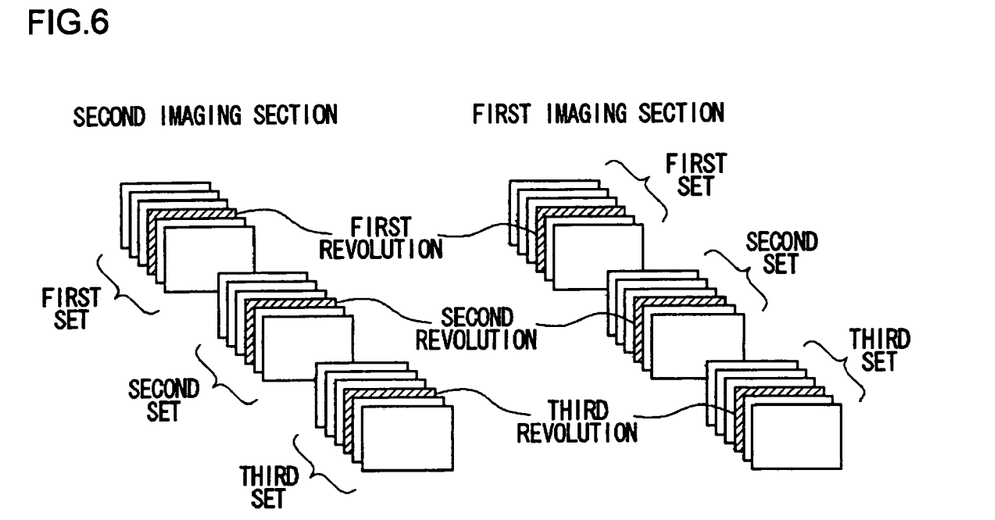
FIG. 6 is a view schematically showing a frame structure of a motion picture taken by the photo assistant tool.

FIG. 6 schematically shows a frame structure of a motion picture taken by the photo assistant tool 12. Frame groups arranged on the left side of FIG. 6 are image groups for the left eye, taken by the second imaging section 22, whereas frame groups arranged on the right side are image groups for the right eye, taken by the first imaging section 20. The frames on the far side in FIG. 6 are taken earlier in terms of time, whereas the frames on the near side are taken later than those on the far side. For example, if one set of images is formed by those for 360 degrees, and thirty sets of images are desired to be taken at each second, the rotator 14 revolves 30 times for each second. Therefore, the rotation cycle $T_0$ is 1/30 sec, and the angular rate ω the rotation is 60π rad/sec. If the angle of rotation Δθ of the frame interval is desired to be, for example, π/3 rad, high-speed shooting at at least 180 frame/sec as the photographic frame rate σ of the first imaging section 20 and the second imaging section 22 is required to be performed. Moreover, one set of images for 360 degrees contains six frames. In this case, the angle of rotation Δθ between frames is π/3. Therefore, if images taken at angles of view for at least 60 degrees in total are obtained, the obtained images are combined to form an omnidirectional image without any discontinuity. In FIG. 6, three frame groups for each of the right and the left eyes are shown. The first frame groups are image groups taken on the first revolution of the rotator 14. In the same way, the second frame groups are taken on the second revolution, and the third frame groups are taken on the third revolution of the rotator 14.

Figure 7:
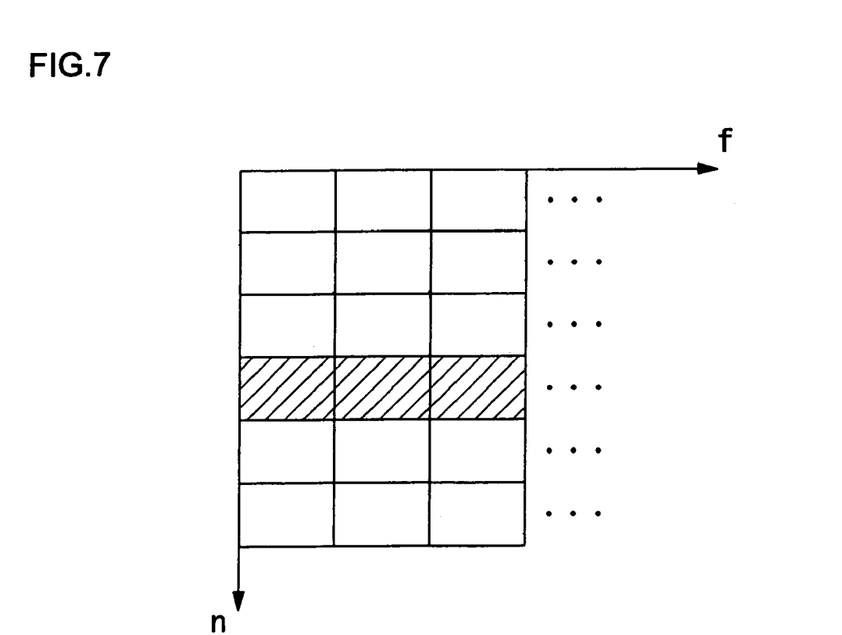
FIG. 7 is a view schematically showing the relation between frame groups and free numbers.

FIG. 7 schematically shows the relation between frame groups and frame numbers. If the image processing device 50 outputs images to a device displaying an image at a limitative angle of view in a specific direction such as an HMD as a display device, the output processing section 70 selects and outputs only one frame from the frame group of each set shown in FIG. 6. Assuming that a frame number in one frame group is n and a set number of the frame group is f, the number of frames in one frame group is $\sigma T_0$ (frames). Therefore, the frame number N throughout all of a plurality of frame groups is: $n + f \times \sigma T_0$. If the direction receiving section 76 acquires an angle V (rad) as information regarding the direction from the HMD, the frame number n of the image to be selected by the image selecting section 72 as an image to be displayed is $V/\Delta\theta$. If $V/\Delta\theta$ is not an integer, the image selecting section 72 may round it off to obtain an integer, may generate an image at an appropriate angle of view based on V for the combining section 66, or may generate an intermediate frame by interpolation using anterior and posterior frames as key frames for the interpolation section 64. The frame number n is common to the right-eye image and the left-eye image. Assuring that the order of display as frames constituting a motion picture is i[0, 1, 2, . . . ], the frame number N[i] to be selected by the image selecting section 72 is:

$$n+i\omega T_0=V/\Delta\theta+i\omega T_0=V\omega T_0/2\pi+i\omega T_0 \quad \text{(Formula 1).}$$

Figure 8:
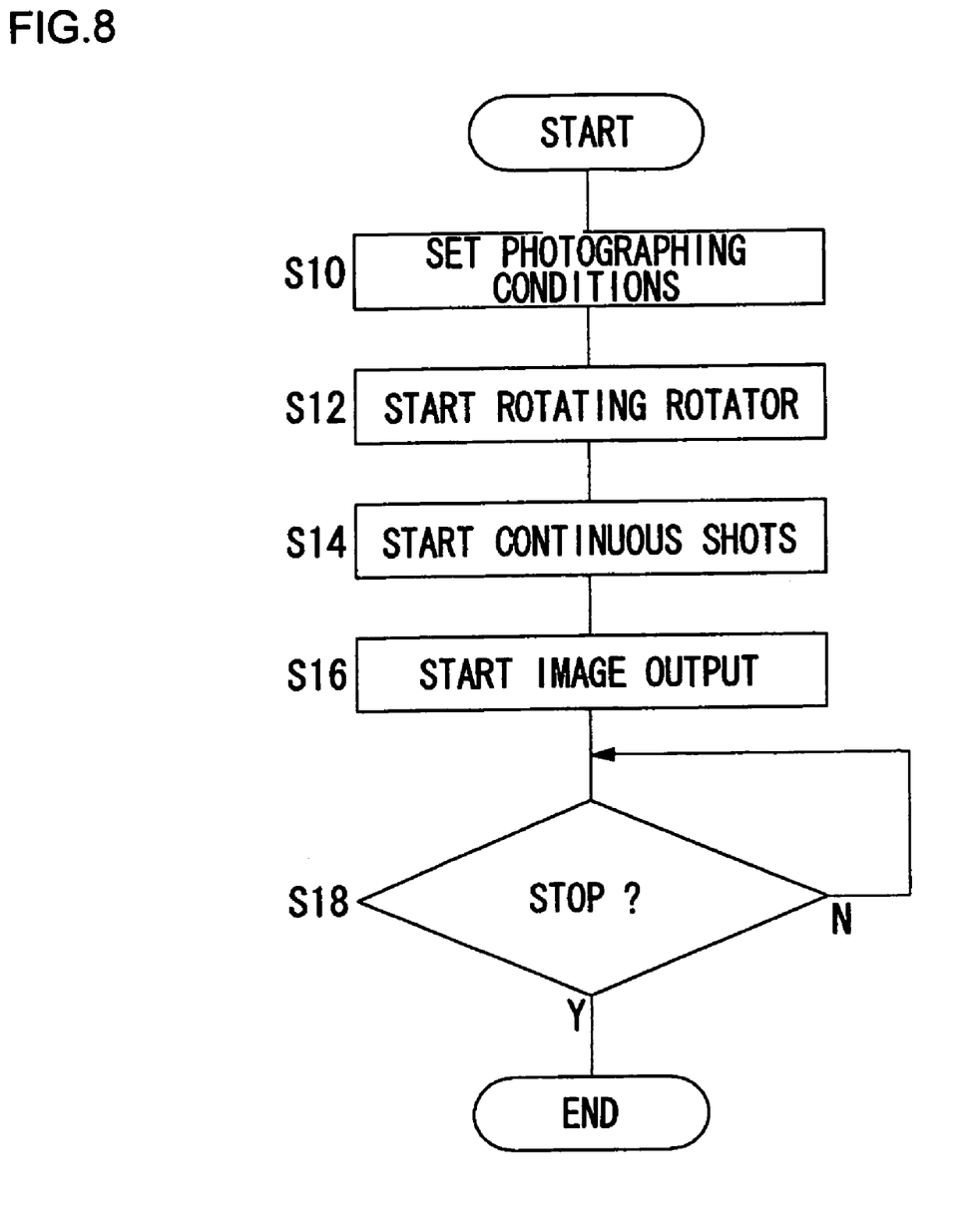
FIG. 8 is a flowchart showing the operation of the photo assistant tool.

FIG. 8 is a flowchart showing the operation of the photo assistant tool 12. First, photographing conditions such as a rotational speed or photographing timing are set in the control section 30 (S10). The control section 30 starts rotating the rotator 14 (S12) while allowing the first imaging section 20 and the second imaging section 22 to start continuous shooting (S14). The control section 30 reads the images continuously shot by the first imaging section 20 and the second imaging section 22 so as to start externally outputting the images in a continuous manner (S16). Until a stop condition is satisfied, for example, the number of revolutions of the rotator 14 or the number of shots reaches a set value or a user directs to stop the operation, the rotation of the rotator 14, the continuous shooting by the first imaging section 20 and the second imaging section 22, and the image output by the control section 30 are repeated (S18N). When the stop condition is satisfied, the control section 30 terminates its operation (S18Y).

Figure 9:
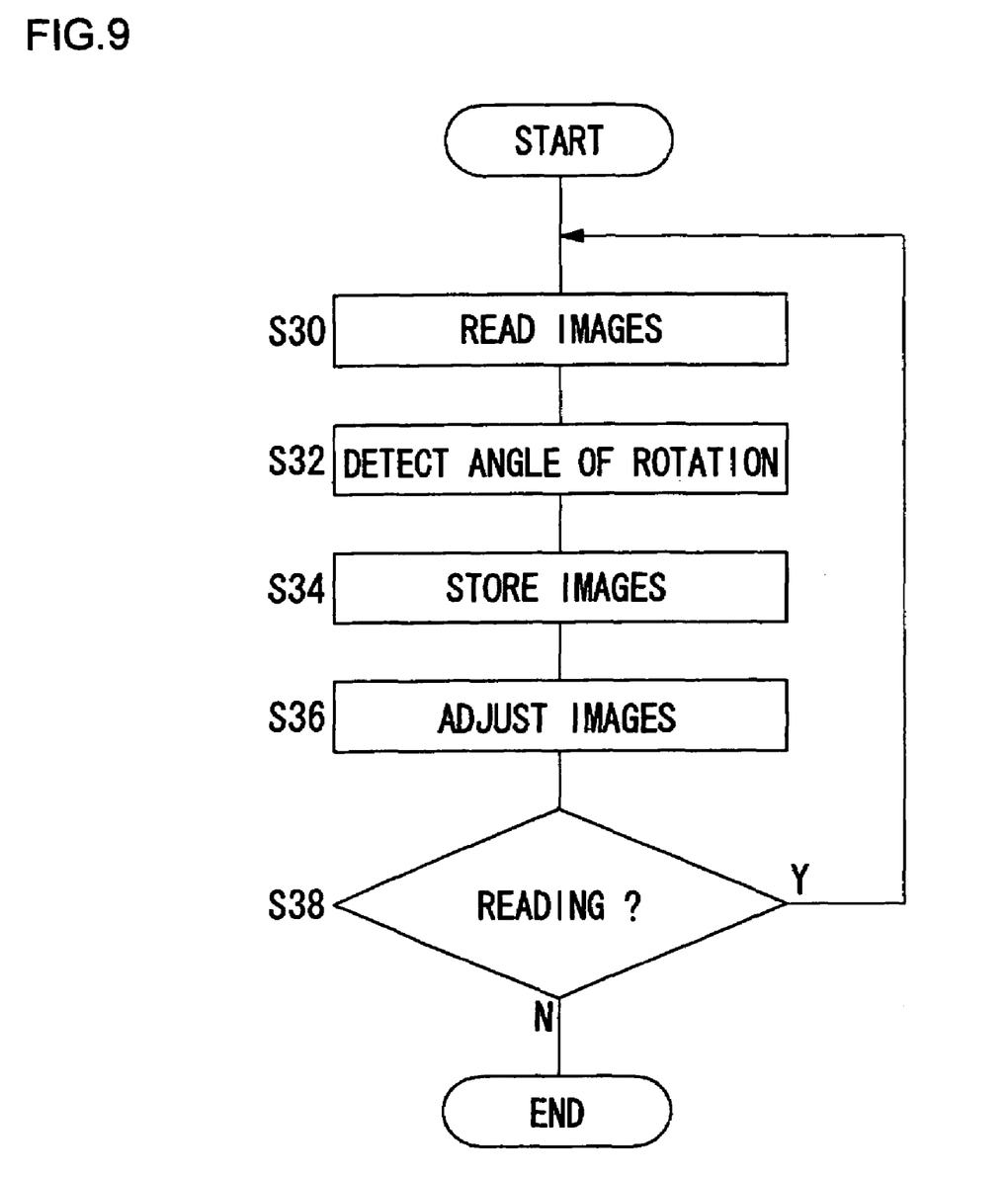
FIG. 9 is a flowchart showing the steps of processing of the image processing device.

FIG. 9 is a flowchart showing processing steps of the image processing device 50. First, the image input section 52 reads a pair of images from the photo assistant tool 12 (S30) and detects an angle of rotation of the rotator 14 when the pair of images are taken (S32). The image input section 52 stores the images in the image retaining section 58 (S34). The image adjusting section 60 adjusts the images stored in the image retaining section 58 (S36). If the photo assistant tool 12 is to output next images (S38Y), the processing at S30 to S36 is repeated. If the photo assistant tool 12 does not output any more images (S38N), the image processing device 50 terminates the processing. If the output processing section 70 outputs the images to the display device simultaneously with the shooting by the photo assistant tool 12, the output processing section 70 processes the output of the images stored in the image retaining section 58 in parallel to the processing at S30 to S38.

Embodiment 2

The photo assistant tool 12 in Embodiment 2 of the present invention differs from that in Embodiment 1 in that it has only one imaging section provided for the rotator 14. A method of acquiring parallax images and a method of acquiring an omnidirectional image differ from those of Embodiment 1.

Figure 10:
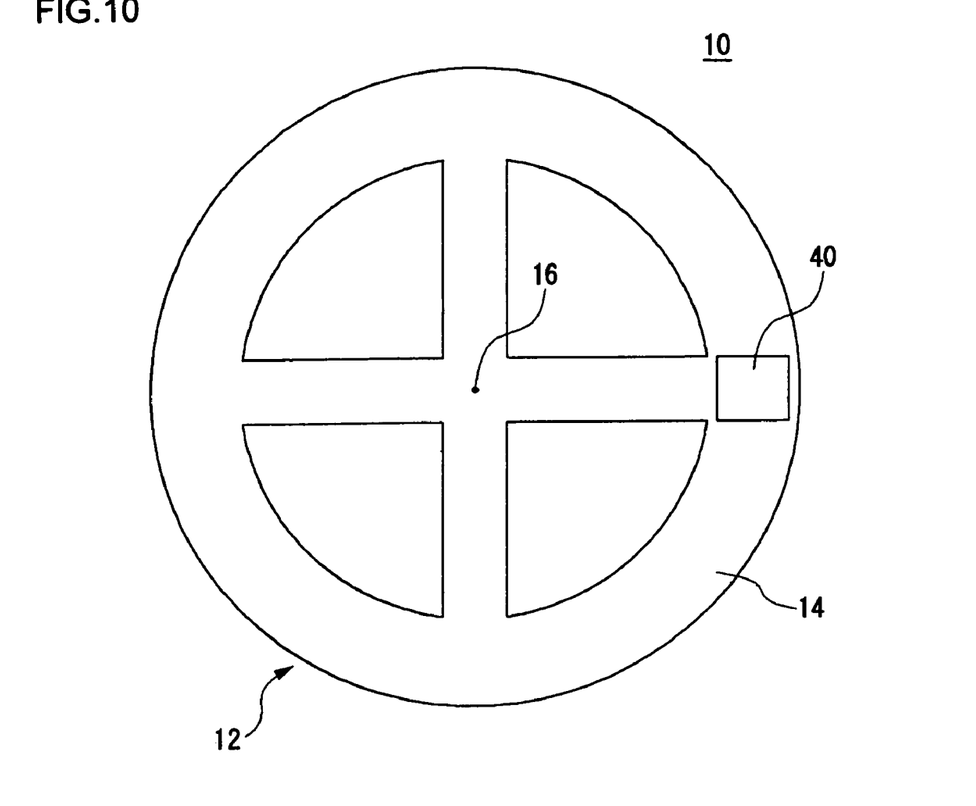
FIG. 10 is a view showing the outer appearance of a rotator according to a second embodiment when viewed from above.

FIG. 10 shows the outer appearance of the rotator 14 according to Embodiment 2 when viewed from above. In this embodiment, one imaging section 40 is provided at the approximate central position on the right side of the upper surface of the rotator 14 in FIG. 10. The imaging section 40 rotates on its axis independently of the rotation of the rotator 14. The continuous shooting is performed while the imaging section 40 is rotating, thereby obtaining an omnidirectional image. The entire rotator 14 also rotates independently of and in addition to the rotation of the imaging section 40. However, the rotation of the rotator 14 in this embodiment is not continuous as in Embodiment 1; it serves to move the imaging section 40 between two points of view for obtaining parallax images. The control section 30 controls the intermittent rotation, assuming the movement between two positions. As a result, parallax images for an omnidirectional image can be obtained. Moreover, by repeating the intermittent rotation of the rotator 14 and the continuous shooting by the imaging section 40 at a high speed, a motion picture made up of omnidirectional parallax images as frames can also be taken.

Assuming that an image group taken while the imaging section 40 rotates at 360 degrees is a set of omnidirectional images, two sets of omnidirectional images can be obtained by a 360-degree rotation when the control section 30 intermittently rotates the rotator 14 at 180 degrees each time. These two sets of the omnidirectional images are respectively an omnidirectional image for the right eye and an omnidirectional image for the left eye to form a pair of omnidirectional parallax images. Moreover, for example, if the control section 30 intermittently rotates the rotator 14 at 90 degrees each time, four sets of omnidirectional images can be obtained by a 360-degree rotation. These four sets of omnidirectional images form two pairs of omnidirectional parallax images corresponding to two sight line directions. As described above, if the number of stops of the rotator 14 during its 360-degree rotation is increased, the number of sets of omnidirectional parallax images is also increased. As a result, finer omnidirectional parallax images can be obtained.

Figure 11:
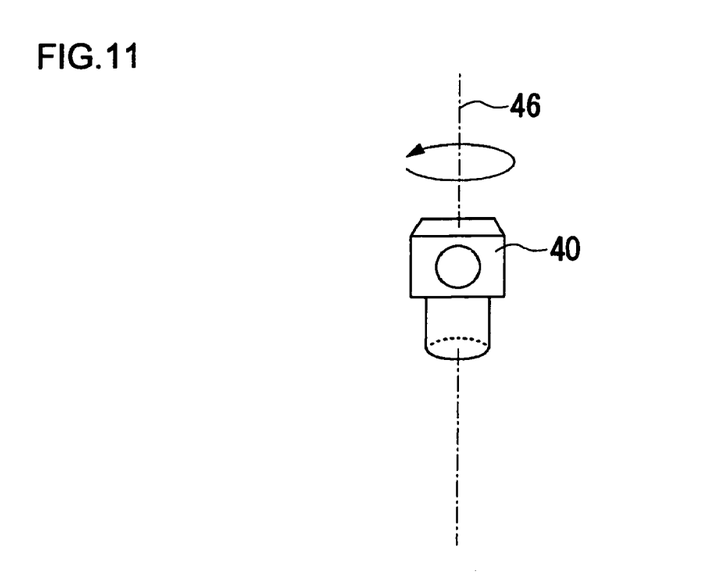
FIG. 11 is a view showing the outer appearance of an imaging section.

FIG. 11 shows the outer appearance of the imaging section 40. The center of rotation of the imaging section 40 corresponds to the center of the position where the imaging section 40 is provided. An axis of rotation 46 perpendicularly crosses the photographic direction, whereas a rotating face of the rotation is approximately parallel to the rotating face of the rotator 14. The imaging section 40 includes a motor for causing the rotation and a control section for the motor therein. As a modified example, however, the rotator 14 may include the motor for causing the rotation of the imaging section 40 and the control section for the motor.

Figure 12:
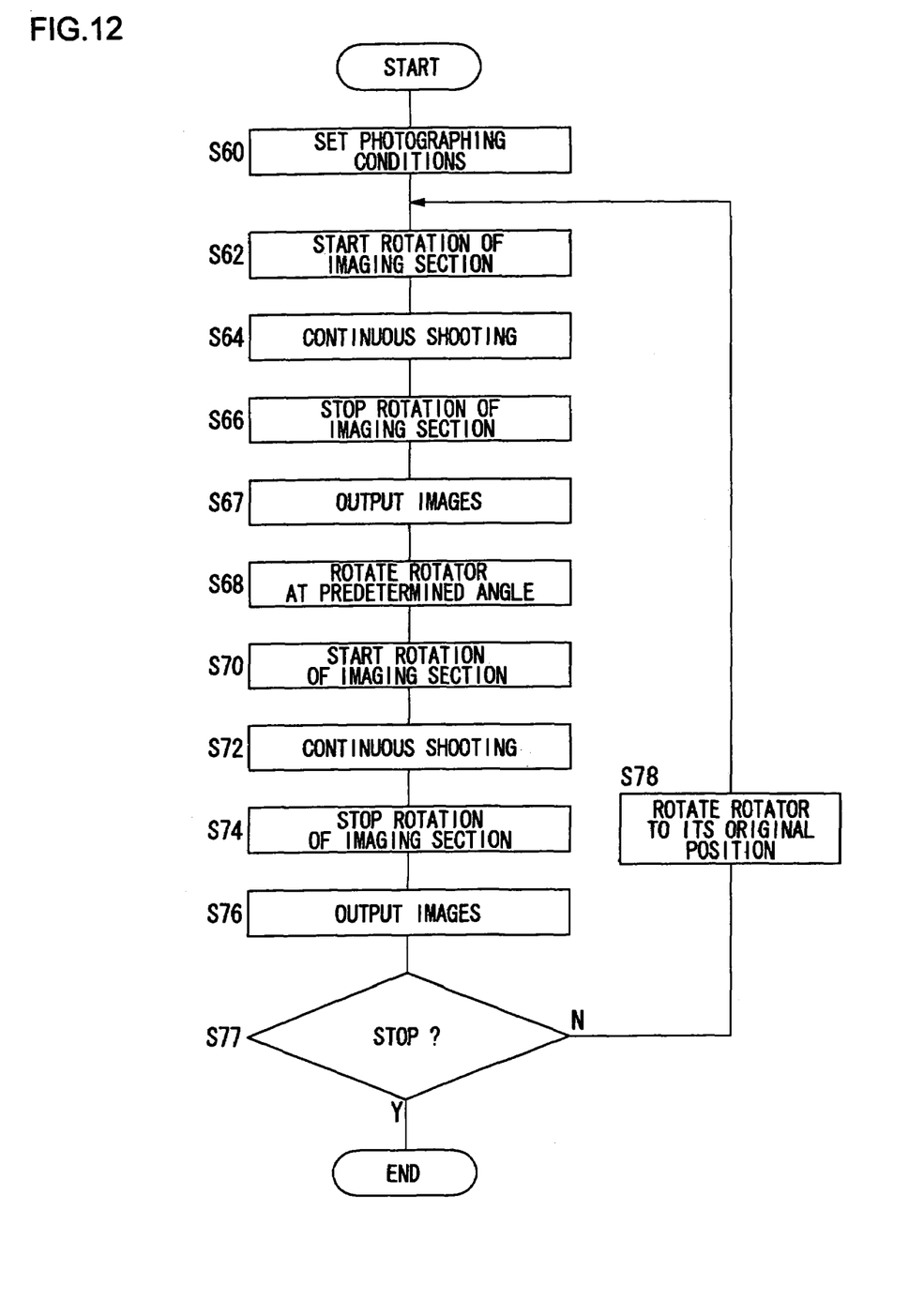
FIG. 12 is a flowchart showing the operation of a photo assistant tool according to the second embodiment.

FIG. 12 is a flowchart showing the operation of the photo assistant tool 12 in Embodiment 2. In the case described below, the imaging section 40 is rotated at 720 degrees while the rotator 14 is rotating at 360 degrees. First, photographing conditions such as a rotational speed or photographing timing are set in the control section 30 (S60). The control section 30 starts rotating the imaging section 40 on its axis (S62). At the same time, the imaging section 40 takes continuous shots during its rotation (S64). When the imaging section 40 finish rotating at 360 degrees, the rotation and the continuous shooting are stopped (S66). This process corresponds to omnidirectional image photography from a first point of view. The control section 30 externally outputs these images (S67). Then, the control section 30 rotates the rotator 14 at a predetermined angle (S68). At this position, the imaging section 40 starts rotating again on its axis (S70). The imaging section 40 takes continuous shots during its rotation (S72). When the imaging section 40 finishes rotating at another 360 degrees, the rotation and the continuous shooting are stopped (S74). This process corresponds to omnidirectional image photography from a second point of view. The control section 30 externally outputs the images (S76). The image from the first point of view and the image from the second point of view form a pair of omnidirectional parallax images. If the operation is to be continued as in the case where the number of revolutions of the rotator 14 is set to be plural as a photographing condition (S77N), the rotator 14 is rotated to its original position where it starts rotating (S78). Then, the photographing operation at S62 to S76 is repeated. When the stop condition is satisfied, the control section 30 terminates its operation (S77Y).

Embodiment 3

Embodiment 3 of the present invention is common to Embodiment 1 in that the rotator 14 of the photo assistant tool 12 is provided with two imaging sections. However, Embodiment 3 differs from Embodiment 1 in that photographic directions of the two imaging sections are different from each other.

Figure 13:
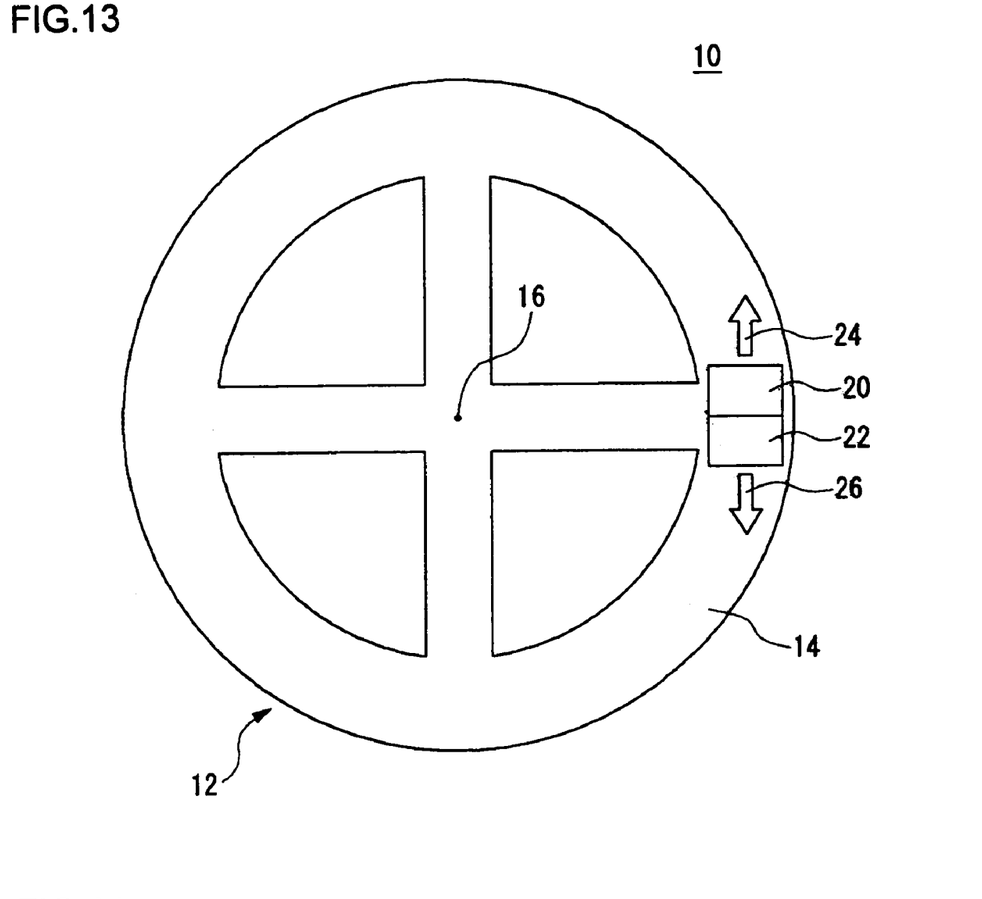
FIG. 13 is a view showing the outer appearance of a rotator according to a third embodiment when viewed from above.

FIG. 13 shows the outer appearance of the rotator 14 according to Embodiment 3 when viewed from above. On the upper face of the rotator 14, the first imaging section 20 and the second imaging section 22 are provided as a plurality of imaging sections as in Embodiment 1 of the present invention. However, in contrast to Embodiment 1, the first imaging section 20 and the second imaging section 22 are both provided on the right side in FIG. 13 so that their photographic directions 24 and 26 are opposite to each other. The photo assistant tool 12 in this embodiment mainly has three operation modes.

In the first mode, after taking images in two directions in the illustrated state, the control section 30 rotates the rotator 14 at 180 degrees. In this state, other images in two directions are taken. In this manner, parallax images in two directions can be simultaneously taken. As a modified example, if images are taken in two directions each time the rotator 14 is rotated at 90 degrees, parallax images in four directions in total can be taken. When the angle of rotation is further reduced, parallax images in respective different directions can also be simultaneously taken.

In the second mode, the control section 30 allows the first imaging section 20 and the second imaging section 22 to take continuous shots while continuously rotating the rotator 14. As a result, omnidirectional parallax images can be obtained. For two images to form a pair of parallax images, however, the angles of rotation of the rotator 14 at their photographing timing have a phase shift of 180 degrees. Therefore, if the frame number N of the image for the left eye is expressed by Formula 1 described in relation with FIG. 7, a frame number N' [i] of the image for the right eye is expressed by: $n + i\sigma T_0 + \pi/\Delta\theta = V/\Delta\theta + \pi/\Delta\theta + i\sigma T_0 = (V+\pi)\sigma T_0/2\pi + i\sigma T_0$.

In the third mode, the control section 30 allows a block composed of the first imaging section 20 and the second imaging section 22 to make continuous shots while rotating the block on its axis. In this case, in contrast to Embodiment 2, an omnidirectional image can be obtained after the rotation at 180 degrees. After the first imaging section 20 and the second imaging section 22 take continuous shots during their rotation at 180 degrees, the rotator 14 is rotated at 180 degrees so that the first imaging section 20 and the second imaging section 22 take continuous shots during their rotation at another 180 degrees. As a result, omnidirectional parallax images can be obtained. As a modified example, the first imaging section 20 and the second imaging section 22 may take continuous shots during their rotation while the rotator 14 is continuously rotated at a high speed so that a motion picture made up of omnidirectional parallax images is taken.

Embodiment 4

Embodiment 4 differs from the embodiments described above in that an omnidirectional camera it used as an imaging section. The imaging section as the omnidirectional camera includes an omnidirectional vision system capable of photographing almost all the directions at a time about the position where the imaging section is provided as a center. The omnidirectional vision system is capable of imaging the surroundings at 360 degrees, for example, by using an optical mechanism such as a curved-face reflector provided therein. If such an omnidirectional camera is applied to, for example, Embodiment 2 or 3, an omnidirectional image can be obtained without rotating the imaging section on its axis.

Embodiment 5

Embodiment 5 of the present invention differs from the aforementioned embodiments in that a general camera is used as the imaging section.

Figure 14:
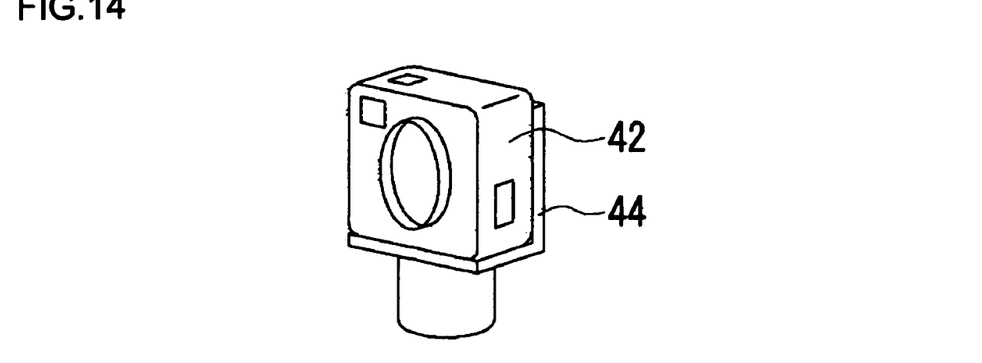
FIG. 14 is a view showing the outer appearance of an imaging section using a general camera.

FIG. 14 shows the outer appearance of the imaging section using a general camera. The imaging section is composed of a camera fixed part 44 for attaching a camera 42 thereto. For photographing, the camera is attached to the camera fixed part 44 to provide an imaging function to the imaging section. The camera fixed part 44 has an L-shaped lateral face and includes a part parallel to and a part vertical to the rotating face. The parallel part is in contact with a back face of the camera 42. The vertical part corresponds to a table on which the camera 42 can be placed, and has a universal-head mechanism for attaching and fixing the camera at the position in contact with the bottom of the camera 42. The universal-head mechanism has a screw that is inserted into a screw hole provided on the bottom of the camera 42 so that the camera 42 is secured onto the camera fixed part 44 by the screw. When the camera 42 is secured, the photographic direction of the camera 42 becomes approximately parallel to the rotating face of the rotator 14. As a result, the photo assistant tool 12 can be realized by a simpler structure using a general camera.

The rotating operation of the imaging section, the rotating operation of the rotator 14, and the photographing method in this embodiment are substantially the same as those in Embodiments 1 to 3. However, a method of acquiring an image may be changed depending on the functions of the camera 42 in some cases. For example, if the camera 42 is a digital camera, an image output terminal of the camera 42 is required to be connected to the control section 30 of the photo assistant tool 12 so as to output an image, or an image is required to be read out from a recording medium attached to the camera 42 by the image input section 52 of the image processing device 50. For example, if the camera 42 is a film camera, the image input section 52 may have the function of acquiring a plurality of digital images from an externally connected apparatus which optically scans a printed picture.

Up to this point, the present invention has been described in conjunction with the embodiments thereof. These embodiments are given solely by way of illustration. It will be understood by those skilled in the art that various modified examples may be made of combinations of the foregoing components and processes, and all such modified examples are also intended to fall within the scope of the present invention. The following provides some of the modified examples.

In the above-described embodiments, the continuous shooting is performed while the rotator 14 is automatically rotated. In a modified example, however, the rotator 14 may be manually rotated. In this case, it is not necessary to provide the motor 32 and the motor control section 34 for the control section 30 of the photo assistant tool 12, and therefore, the structure can be simplified. In such a case, a rotation angle sensor may be additionally provided in the control section 30.

Although the imaging sections such as the first imaging section 20, the second imaging section 22, the imaging section 40, and the camera 42 are provided on the upper face of the rotator 14 in the above-described embodiments, the imaging sections may be provided on the bottom face of the rotator 14 or inside the rotator 14 in a modified example.

Although the rotator 14 and the support base 18 have deadweights for smoothening the rotation in the above-described embodiments, a weight for smoothening the rotational movement may be attached to the vicinity of the outer circumference of the rotator 14 in a modified example. A plurality of weights may also be attached to the vicinity of the outer circumference at every 90 degrees. A weight of the weight may be determined in accordance with the weight of the first imaging section 20, the second imaging section 22, the imaging section 40, or the camera 42. The rotator 14 may include weight fixed parts for attaching a plurality of weights at every 90 degrees.

In the above-described embodiments, if the imaging section such as the first imaging section 20, the second imaging section 22, the imaging section 40, or the camera 42 is made to rotate, the imaging section itself rotates on its axis. Each of the imaging sections in a modified example may capture the image of a subject through a reflector having a predetermined shape. With this structure, the photographic direction may rotate by moving or rotating the reflector without rotating the imaging section itself for the rotation of the imaging section.

The orientation of the viewer of an image is detected by the direction sensor of the HMD so as to be transmitted to the direction receiving section 76 in the above-described embodiments. In a modified example, the direction receiving section 76 may be realized in the form of a controller used in a game machine or a multimedia device. In such a case, the direction receiving section 76 may acquire a direction directed by the viewer through the operation of a button on the controller.

What is claimed is:

1. An image processing method comprising:
   allowing an imaging section provided for a predetermined rotatable member having a rotating face in a substantially horizontal direction to continuously shoot in photographic directions approximately parallel to the rotating surface while the member is rotating, and also allowing the imaging section to continuously shoot while rotating about a position of the imaging section independently of the rotation of the member so that the photographic direction of the imaging section can be turned in a direction over the almost entire surroundings; and
   reading the continuously shot images taken during the rotation of the imaging section as images of the almost entire surroundings, and reading the continuously shot images taken during the rotation of the member as parallax images.

2. The image processing method according to claim 1, further comprising outputting the images for the almost entire surroundings on an omnidirectional screen having a curved shape or a cylindrical inner face.

3. An image processing method comprising:
   allowing an imaging section provided for a predetermined rotatable member having a rotating face in a substantially horizontal direction to continuously shoot in photographic directions approximately parallel to the rotating surface while the member is repeatedly rotating, so as to take a motion picture, and also allowing the imaging section to continuously shoot to take a motion picture while rotating about a position of the imaging section independently of the rotation of the member so that the photographic direction of the imaging section can be turned in a direction over the almost entire surroundings; and
   reading the continuously shot images forming the motion picture taken during the rotation of the imaging section as images of the almost entire surroundings, and reading the continuously shot images forming the motion picture taken during the rotation of the member as parallax images.

4. The image processing method according to claim 3, further comprising outputting the images for the almost entire surroundings on an omnidirectional screen having a curved shape or a cylindrical inner face.

5. An image processing method comprising:
   performing continuous shooting in photographic directions opposite to each other and approximately parallel to a substantially horizontal rotating face of a predetermined rotatable member while the member is rotating, the shooting being done by a plurality of imaging sections provided on the rotating face of the rotatable member such that at least one of the imaging sections is provided proximate to another imaging section; and
   reading continuously shot images taken during the rotation of the member, wherein
   the shooting includes acquiring each of a plurality of images obtained by a single shot as an image in the direction in which the image is taken, and repeating the acquisition at different photographic points by continuously shooting while the member is rotating, and
   the reading includes storing a combination of images acquired in the same direction at different photographic points as parallax images in that direction and ultimately storing the continuously shot images as parallax images for the almost entire surroundings by repeating the storage for different directions.

6. An image processing method comprising:
   performing continuous shooting in photographic directions opposite to each other and approximately parallel to a substantially horizontal rotating face of a predetermined rotatable member while the member is rotating, so as to take a motion picture, the shooting being done by a plurality of imaging sections provided on the rotating face of the rotatable member such that at least one of the imaging sections is proximate to another imaging section; and
   reading the motion picture taken during the rotation of the member, wherein
   the shooting includes acquiring each of a plurality of images forming the motion picture and obtained by a single shot as an image in the direction in which the image is taken, and repeating the acquisition at different photographic points by continuously shooting while the member is rotating, and
   the reading includes storing a combination of images acquired in the same direction at different photographic points as parallax images in that direction and ultimately storing the motion picture as parallax images for the almost entire surroundings by repeating the storage for different directions.

7. An image processing device comprising:
   an image input section which reads a plurality of images continuously shot in photographic directions opposite to each other and approximately parallel to a substantially horizontal rotating face of a predetermined rotatable member while the member is rotating, the shooting being done by plurality of imaging sections provided on the rotating face of the rotatable member such that at least one of the imaging sections is provided proximate to another imaging section;

an image retaining section which stores the plurality of images in correlation with their photographic timing; and an output processing section which outputs the plurality of stored images, wherein the image input section reads each of two or more images obtained by a single shot by the plurality of imaging sections as an image in the direction in which the image is taken, and repeats the reading at different photographic points by continuously shooting while the member is rotating;

the image retaining section stores a combination of images in the same direction thus read at different photographic points as parallax images in that direction and ultimately storing the plurality of images as parallax images for the almost entire surroundings by repeating the storage for different directions; and the output processing section outputs the parallax images for the almost entire surroundings thus stored.

8. An image processing device comprising:

an image input section which reads a motion picture obtained by continuous shooting in photographic directions opposite to each other and approximately parallel to a substantially horizontal rotating face of a predetermined rotatable member while the member is rotating, the shooting being done by a plurality of imaging sections provided on the rotating face of the rotatable member such that at least one of the imaging sections is provided proximate to another imaging section;

an image retaining section which stores a plurality of images making up the motion image in correlation with their photographing timing; and an output processing section which outputs the plurality of stored images, wherein the image input section reads each of two or more images obtained by a single shot by the plurality of imaging sections and forming the motion picture as an image in the direction in which the image is taken, and repeats the reading at different photographic points by continuously shooting while the member is rotating;

the image retaining section stores a combination of images in the same direction thus read at different photographic points as parallax images in that direction and ultimately storing the plurality of images as parallax images for the almost entire surroundings by repeating the storage for different directions; and the output processing section outputs the parallax images for the almost entire surroundings thus stored.

* * * * *